United States Patent [19]
Hsieh

[11] Patent Number: 5,537,837
[45] Date of Patent: Jul. 23, 1996

[54] AUTOMOBILE AIR CONDITIONING SYSTEM

[75] Inventor: Wen-Chan Hsieh, Taipei Hsien, Taiwan

[73] Assignee: Liang-Chi Chiang, Taichung, Taiwan

[21] Appl. No.: 401,335

[22] Filed: Mar. 9, 1995

Related U.S. Application Data

[63] Continuation of Ser. No. 72,312, Jun. 7, 1993, abandoned.

[51] Int. Cl.$^6$ .............................. F25B 15/00; F25B 27/02
[52] U.S. Cl. .............................. 62/238.3; 62/239; 62/476
[58] Field of Search .............................. 62/476, 487, 495, 62/238.3, 239, 244

[56] References Cited

U.S. PATENT DOCUMENTS

| | | | |
|---|---|---|---|
| 2,192,367 | 3/1940 | Prince | 62/238.3 |
| 2,783,622 | 3/1957 | Bourassa | 62/238.3 |
| 3,101,599 | 8/1963 | Pippert et al. | 62/238.3 |
| 3,389,574 | 6/1968 | McGrath | 62/476 |
| 3,661,200 | 5/1972 | McNamara | 165/42 |
| 4,178,989 | 12/1979 | Takeshita | 165/62 |
| 4,307,575 | 12/1981 | Popinski | 62/148 |

*Primary Examiner*—Henry A. Bennett
*Assistant Examiner*—William C. Doerrler

[57] ABSTRACT

An automobile air conditioning system comprises generally a regenerator, a segregator, a condenser, an evaporator, an absorber, a heat exchanger and a plurality of conduits intercommunicated therein between to form a circulation system producing cooled air. The improvement of this disclosure is characterized with the adaptation of a coil tube wound around the outer periphery of an exhaust pipe and utilizing the residual heat of the waste gas expelled from the engine to vaporize the liquidized refrigerant NH, instead of a compressor. In addition a tubular network is provided to utilize the heat from the sun which is collected on roof and bonnet panels, to strengthen the capability of cooled air production. This invention would release the load of a compressor from the engine and achieve a savings of energy.

4 Claims, 3 Drawing Sheets

AUTOMOBILE AIR CONDITIONING SYSTEM

This application is a continuation-in-part of application Ser. No. 08/072,312 filed Jun. 7, 1993, now abandoned.

BACKGROUND OF THE INVENTION

The present invention relates to air conditioners, and more particularly to an air conditioning system adaptable to automobiles, which is designed to utilize the high temperature from the exhaust pipe to help provide cool or warm air in an automobile, instead of a compressor.

Conventional automobile air conditioners (see FIG. 1) have a compressor 3 generated by an engine via a belt 2 to compress the refrigerant inside the conduits into an evaporator for heat exchange in order to invert the liquidized refrigerant into vapor inside the evaporator. Because of that the inversion process needs a great deal of heat absorbed from the interior of an automobile, and then the vaporized refrigerant is reverted back into liquid inside a condenser. Whereby, a circular inversion continuously absorbs the heat making the air inside the automobile become cooler by certain degrees. However, this arrangement takes a great deal of power from the engine 1 so that the engine 1 can't exert it's full power to the driving system. On the other hand, about one fourth of the energy of the carbureted fuel is needed to impact the pistons inside the cylinders, where the rest of it becomes waste gas which is expelled from the engine via an exhaust pipe. The frequency value of the vibratory node from the high temperature and high pressure of the gas at the manifold is about several thousand times per minute which creates intolerable noise without proper treatment. Normally, the pressure is reduced when the gas is exhausted out of the pipe via a muffler, but a minor noise is inevitable except when the pressure of the expelled gas is in balance with the atmospheric pressure. Therefore, to keep the output of the engine directed more fully to the driving system and to reduce the pressure of the exhausted gas to become in balance with the atmospheric pressure are a problems to automobile designers.

SUMMARY OF THE PRESENT INVENTION

The present invention has a main object to provide an automobile air conditioning system which utilizes the high temperature of the waste gas generated by the engine and expelled through the exhaust pipe to produce cool or warm air for an automobile, instead of using a compressor.

Another object of the present invention is to provide an automobile air conditioning system which can absorb and utilize the heat reserved at the roof panel and the bonnet of an automobile to produce supplementary cool air inside the evaporator.

Accordingly, the present invention of an automobile air conditioning system comprises generally a regenerator, a segregator, a condenser, an evaporator, an absorber, a heat exchanger and a plurality of conducts intercommunicated thereto between to form a circulating cooled air production system. The improvement is characterized in utilizing the residual heat from the exhaust pipe of an engine by helically winding a coil tube around the main portion of the exhaust pipe so that the liquidized refrigerant NH3 from the regenerator will flow through and be heated into a mixture of the vapor and NH3 and enter into the segregator for a process of separation. Then, the vapor enters into the condenser via a first capillary tube and from there enters into the evaporator for a process of vaporization therein via a second capillary tube after becoming droplets inside the condenser. Cooled air is therefore produced and vented into the interior of the automobile. The vapor from inside the evaporator will then go to the absorber and re-enter the regenerator after it is mixed with NH3 which is returned from the segregator after being processed thereto. Whereby, a cooling circulation for this system is therefore completed. Because a great deal of heat therein is expended on the process of vaporization, there is less heat to be absorbed into the cars interior, and less cooling is actually needed.

The warm air is produced by shutting off a heat compulsory dissipation device at the condenser so as to lead the warm air via a control valve directly into the evaporator and vent it into the interior of the automobile.

A recurrent tubular network is disposed, in an alternate arrangement beneath the roof panel and the bonnet of an automobile and respectively connected with the segregator and the condenser the liquidized refrigerant NH3 in the segregator will partially lead to the tubular network for a supplementary vaporization from the heat reserved therein under sun shine. The vapor of the liquidized NH3 will then be directed to the condenser and the evaporator for producing cooled air therein.

The objects and advantages will become apparent in consideration of the ensuing description and drawings.

DETAIL DESCRIPTION OF THE PREFERRED EMBODIMENT OF THE PRESENT INVENTION

Figure 1:
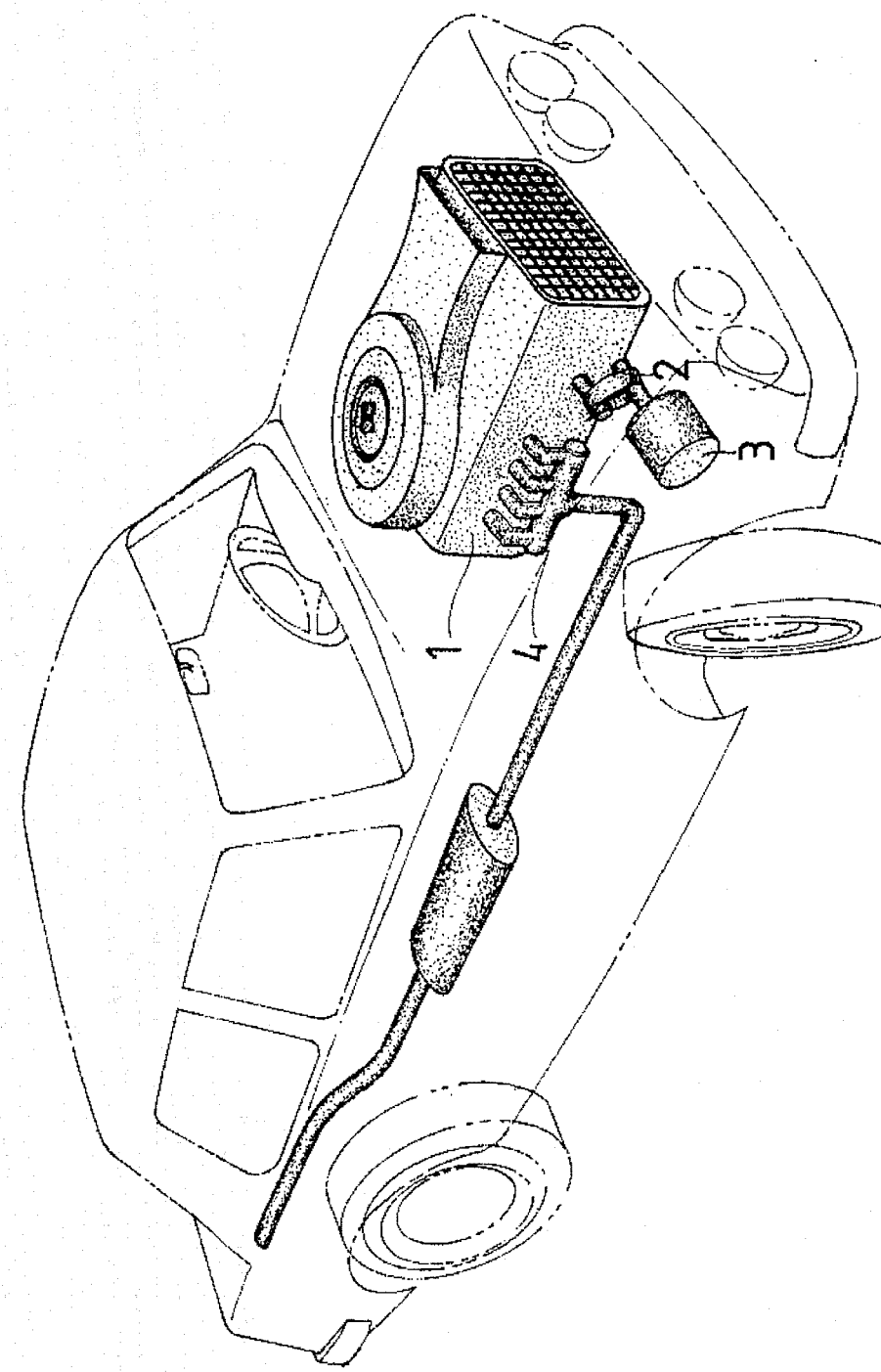
FIG. 1 is a perspective view to show a car air conditioner of the prior art.
Figure 2:
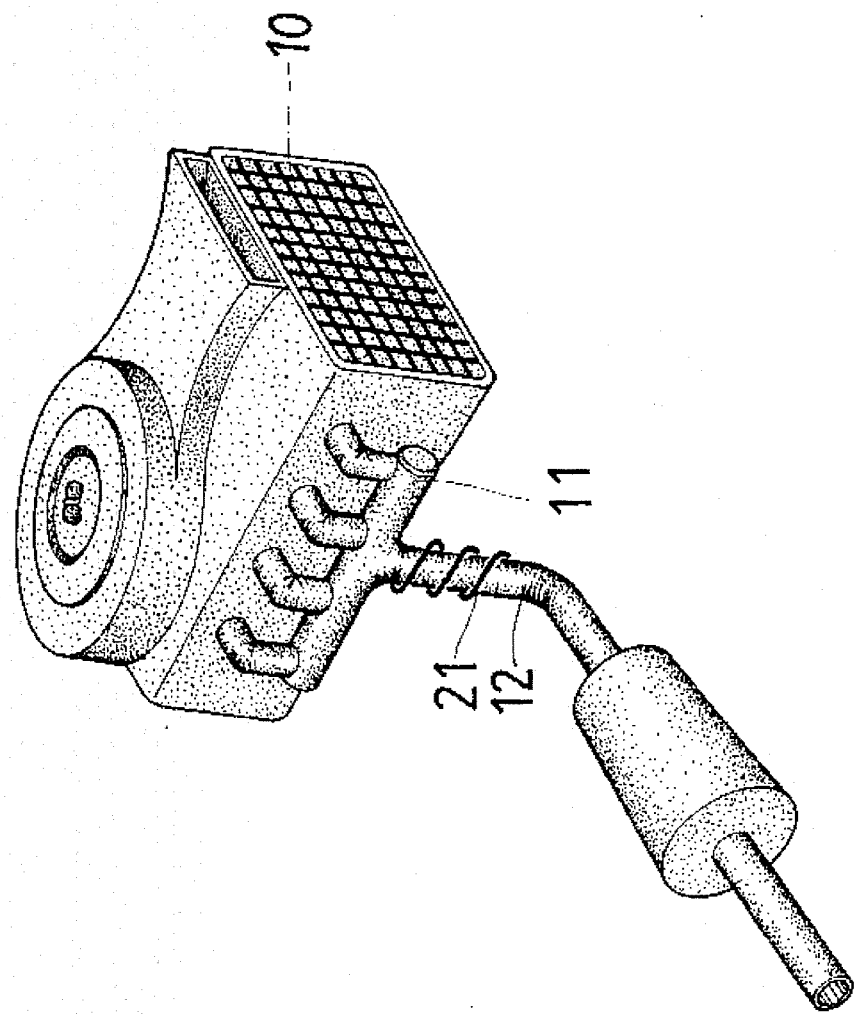
FIG. 2 a perspective view to partially show the preferred embodiment according to the present invention.
Figure 3:
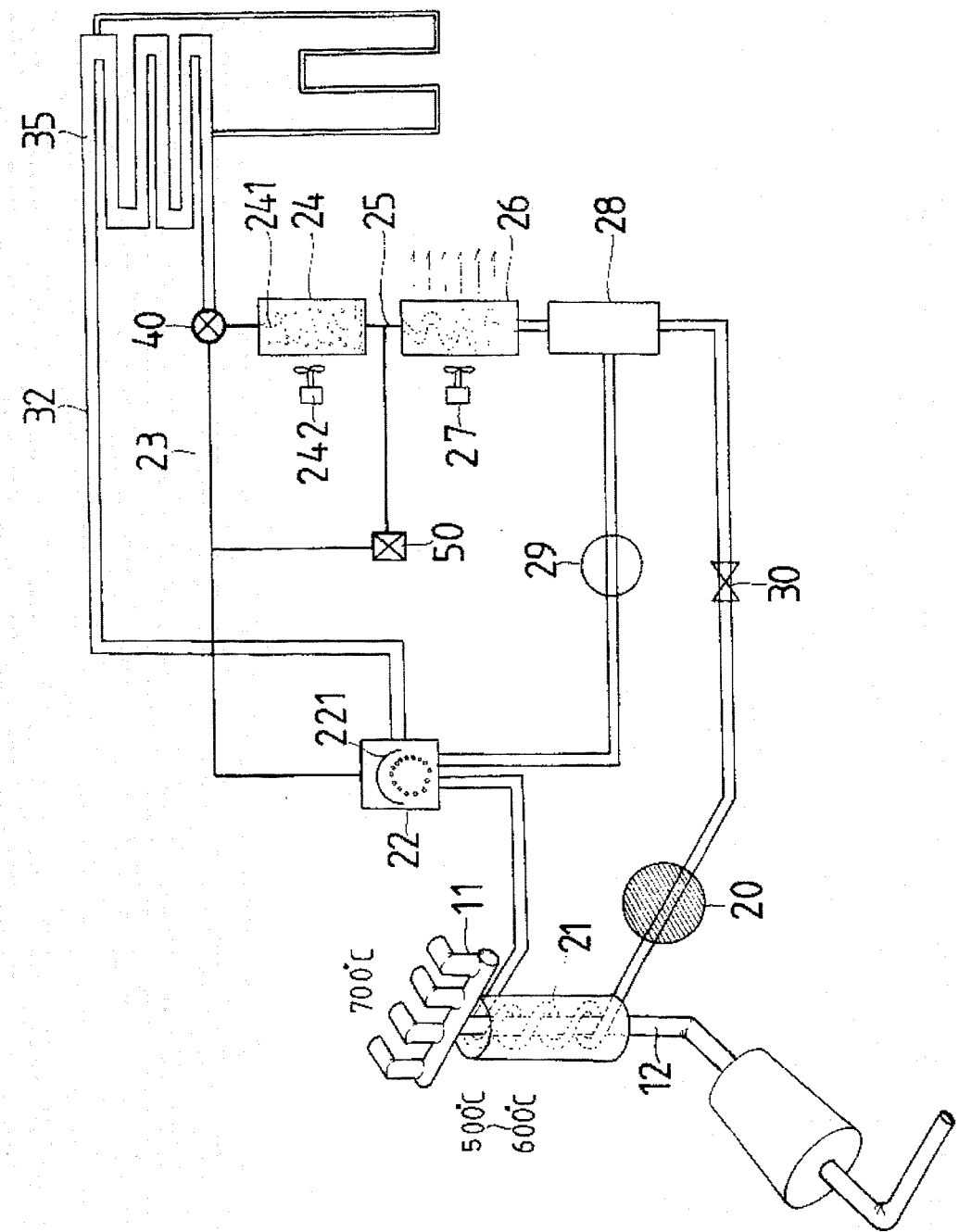
FIG. 3 is a schematic diagram to show the preferred embodiment according to the present invention.

Referring to FIGS. 2 and 3 of the drawings, the present invention of an automobile air conditioning system comprises generally a regenerator 20, a segregator 22, a condenser 24, an evaporator 26, an absorber 28, a heat exchanger 29 and a plurality of conduits intercommunicated therein between to form a circulation system producing cooled air thereof. The improvement is characterized in a coil tube 21 which is connected in between the regenerator 20 and the segregator 22 helically winding on the medial portion thereon the outer periphery of the main portion 12 of the exhaust pipe from the engine 10. The tube 21 is wrapped with an insulating material thereon the outer periphery to keep the heat therein from being dissipated into the air.

When the engine begins to run, about three quarters of the combusted carbureted fuel becomes waste gas as it is expelled out of the engine 10, due to the high temperature and high pressure created therein. Normally, the temperature at the manifold 11 is about 700° C. and about 500° C.–600° C. at the main portion 12 of the exhaust pipe 100. The liquidized refrigerant NH3, coming from the regenerator 20 will be vaporized into a mixture of vapor and NH3 inside the coil tube and flows upwards into the segregator 22 for a process of separation by an arched dividing plate 221 therein. Then, the vapor is led into the condenser 24 via a first capillary tube 23 and a three way tube 40 and refrigerated therein by a helical refrigerating tube 241 and a fan 242 until the vapors become droplets collected in the bottom of the condenser 24 and continuously flow into the evaporator 26 via a second capillary tube 25. The evaporator is in an internal vacuum in order to facilitate the speedy evaporization of the droplets therein. Cooled air is therefore produced and blown into the interior of an automobile by an air vent 27. Because a great deal of heat is absorbed at this stage, the car is further cooled. The vapor inside the evaporator 26 will be directed to the absorber 28 and mixed therein with the NH3 coming from the segregator 22 via a heat exchanger 29 and then the mixture of liquidized refrigerant NH3 therein is returned to the regenerator 20 via a check valve 30 for continuous supply to the coil tube 21. Whereby, a circulation of cooled air production is therefore completed.

The warm air is produced by shutting off the fan 242 at the condenser 24 and opening the control valve 50 so as to lead the hot vapor enter directly into the evaporator 26 and blow the warm air into the interior of an automobile by the air vent 27.

An alternative arrangement (see also FIG. 3) shows a tubular network 35 disposed beneath the roof panel and the bonnet of an automobile and connected respectively with the segregator 22 and the condenser 24. The liquidized refrigerant NH3 inside the segregator 22 will partially flow to the network 35 via a tube 32 and vaporize therein under sun shine, prior to joining with the vapor from the segregator 22 inside the condenser via the three way tube 40. This arrangement would strengthen the capability of cool air production especially under a fiery sun.

Based on the aforediscussed structural improvement, the present invention provides at least the following advantages:

a) it provides an automobile air conditioning system without relying on a compressor thereby freeing the engine to exert its power more directly to the driving system. It is otherwise an energy saving source.

b) the high temperature of the waste gas which is reduced by the coil tube around the exhaust pipe, enables a reduction of the noise at the outlet of an exhaust pipe, and c) an arrangement of the tubular network beneath the roof panel and the bonnet could strengthen the capability of the cooling air production.

The scope of this invention should be determined by the appended claims and their legal equivalents rather than by the example given in aforediscussed specification.

I claim:

1. An automobile air conditioning system comprising generally a regenerator, a segregator, a condenser, an evaporator, and absorber, a heat exchanger and a plurality of conducts inter-communicated thereinbetween to form a cool air production system thereof, the improvement being characterized in adaptation of a coil tube helically wound on the outer periphery of the main portion of an exhaust pipe and utilizing the residual heat of the waste gas generated by engine to vaporize the liquidized refrigerant $NH_3$ for said system instead of a compressor;

said system further comprising:

a pair of first and second capillary tubes, said first capillary tube being connected in-between said segregator and said condenser; said second capillary tube being connected in-between said condenser and said evaporator;

a tubular network, said tubular network being disposed beneath the roof panel and the bonnet of an automobile and connected respectively with said segregator and said condenser;

a three way tube, said tube being adapted to join the vapors from said segregator and said tubular network and lead them to said condenser;

a control valve, said valve being adapted to control the heat vapor from said segregator to said evaporator;

A check valve, said valve being adapted to lead the mixture of liquidized refrigerant $NH_3$ to said regenerator and prevent said refrigerant $NH_3$ from retaining to the absorber;

When said liquidized refrigerant $NH_3$ supplied from said regenerator having been vaporized by heat from said exhaust pipe and flows upwards into said segregator via said coil tube for a process of separation, then a separated hot vapor flows via said first capillary tube and joins at said three way tube with the vapor coming from said tubular network together into said condenser, said hot vapor being condensed therein prior to becoming drops to enter into said evaporator via said second capillary tube for vaporization and producing cooled air therein; said vapor inside said evaporator having further been absorbed into said absorber and mixed therein with $NH_3$ which is separated out of said segregator via said heat exchanger; a mixture of said liquidized refrigerant $NH_3$ inside said absorber being led to said regenerator via said check valve for continuous supply to said coil tube, circulation for cool air production being therefore completed.

2. An automobile air conditioning system according to claim 1, wherein said evaporator is kept in a vacuum to facilitate a speedy vaporization of said drops therein.

3. An automobile air conditioning system according to claim 1, wherein said control valve is opened in cooperation with a shut off air vent at said condenser to lead hot vapor from said segregator directly into said evaporator for producing warm air.

4. An automobile air conditioning system according to claim 1, wherein said tubular network is adapted to utilize the heat collected from sun-shine to partially vaporize said liquidized refrigerant $NH_3$ for strengthening the capability of cool air production.

* * * * *

UNITED STATES PATENT AND TRADEMARK OFFICE
CERTIFICATE OF CORRECTION

PATENT NO. : 5,537,837
DATED : Jul. 23, 1996
INVENTOR(S) : Wen-Chan Hsieh

It is certified that error appears in the above-identified patent and that said Letters Patent is hereby corrected as shown below:

On title page, item [75], "Taipei Hsien, Taiwan" should read --No 4. Mao-Ta St., Hsiao-Kang District, Kao-Hsiung City, Taiwan, R.O.C.--

Signed and Sealed this

Twentieth Day of April, 1999

*Attest:*

Q. TODD DICKINSON

*Attesting Officer*  Acting Commissioner of Patents and Trademarks